T. G. STILES.
RAIL BRACE.
APPLICATION FILED FEB. 18, 1916.
1,230,534.
Patented June 19, 1917.
5 SHEETS—SHEET 2.
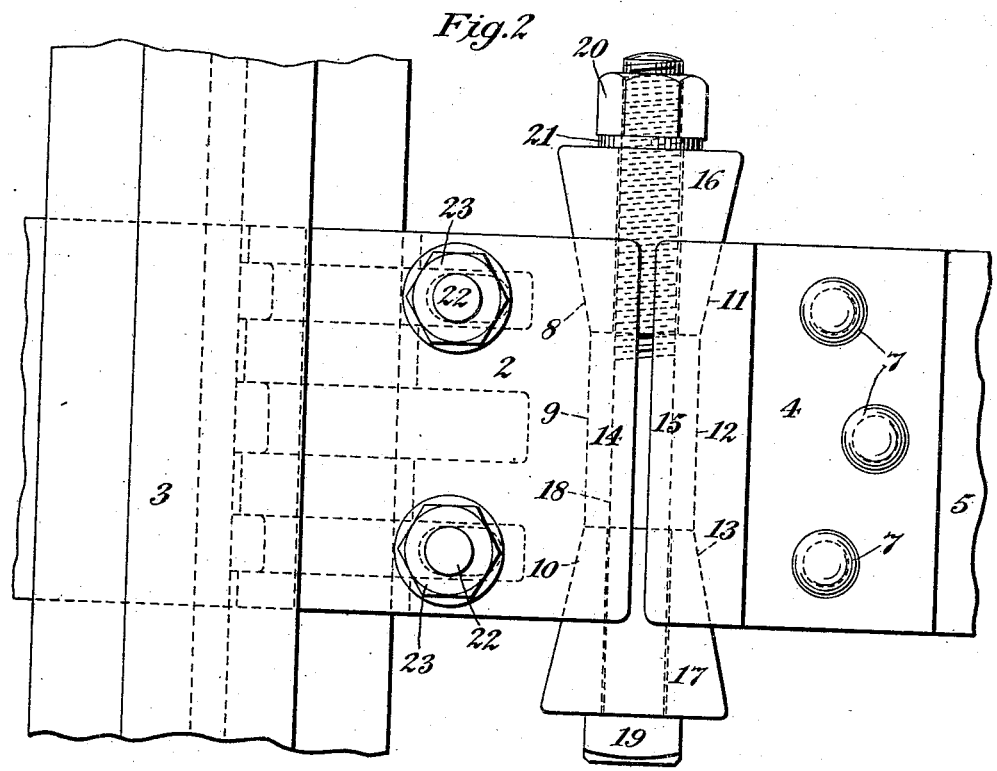
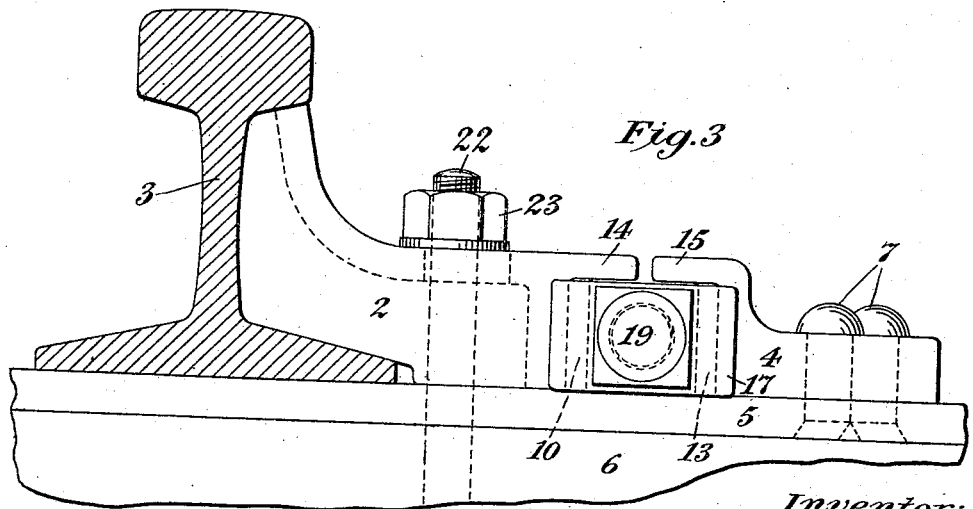

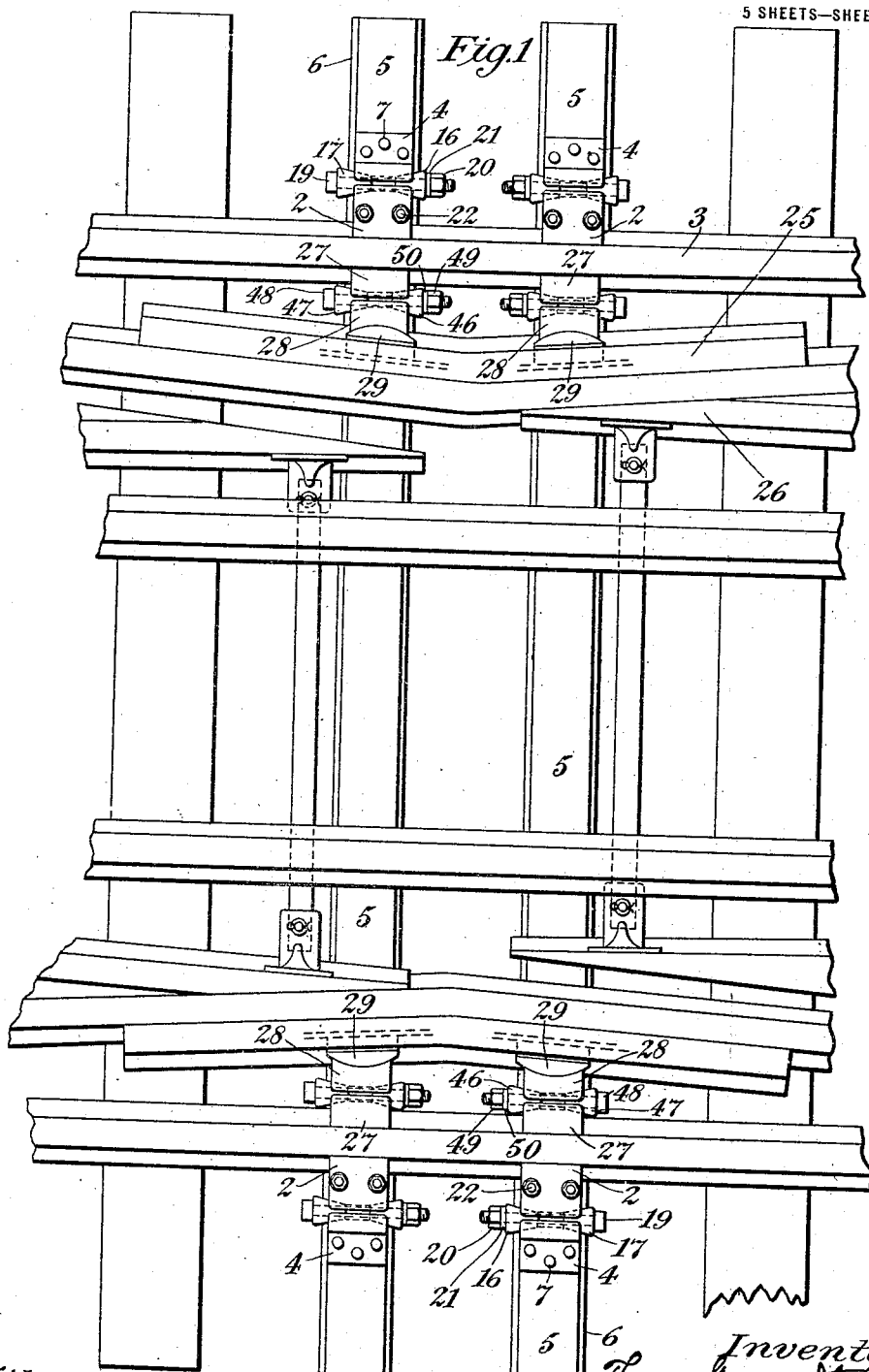

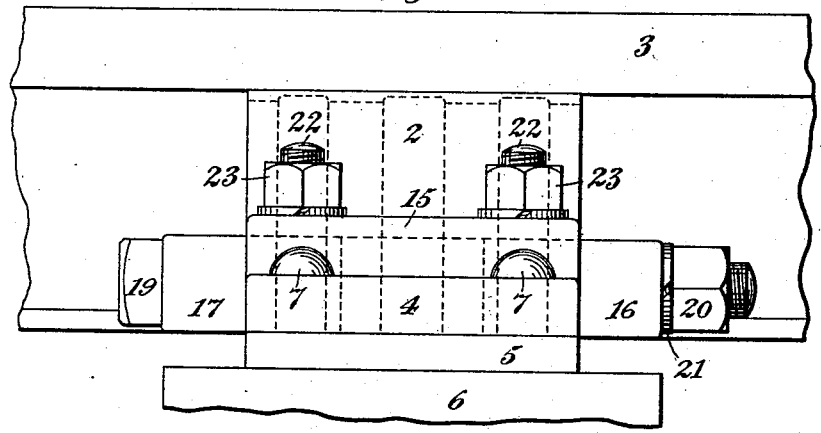
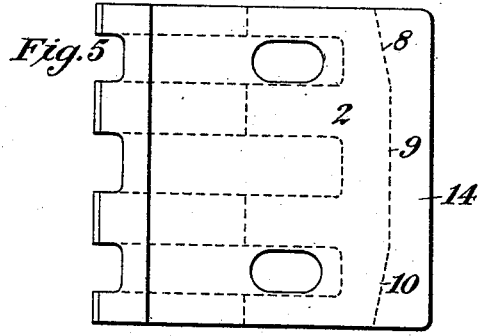
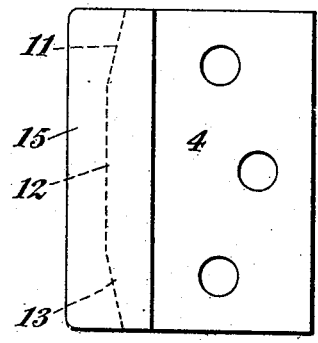
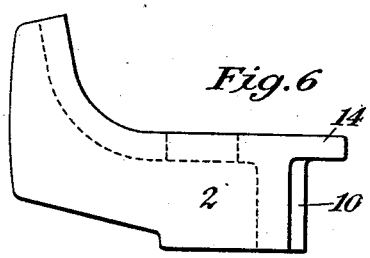
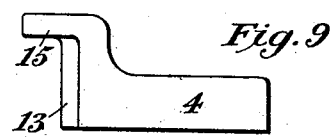
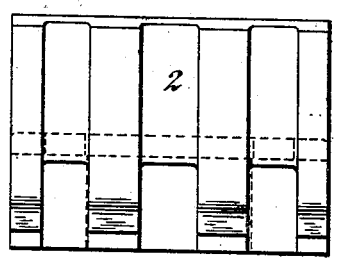

T. G. STILES.
RAIL BRACE.
APPLICATION FILED FEB. 18, 1916.

1,230,534.

Patented June 19, 1917.
5 SHEETS—SHEET 4.

Witness:
Chas. D. King.

Inventor:
Thomas George Stiles,
by
Attorney.

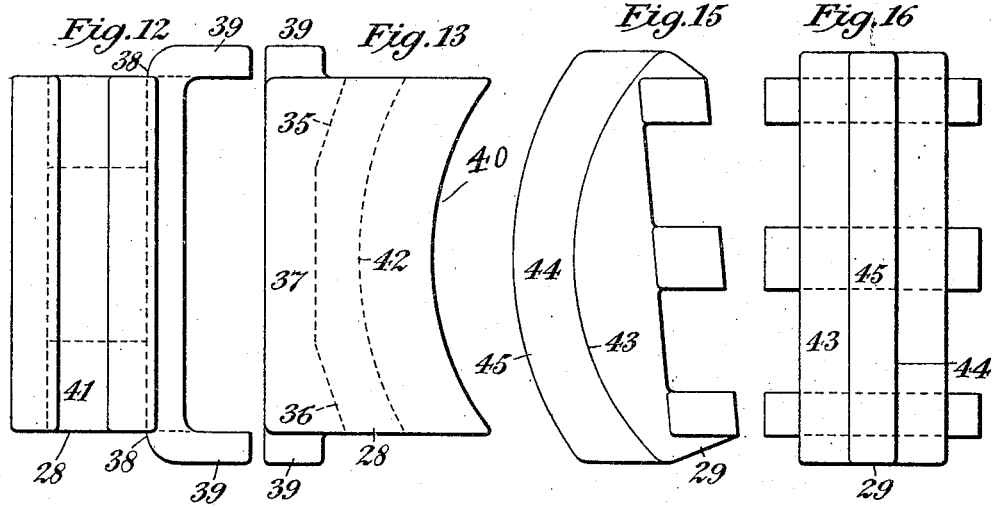
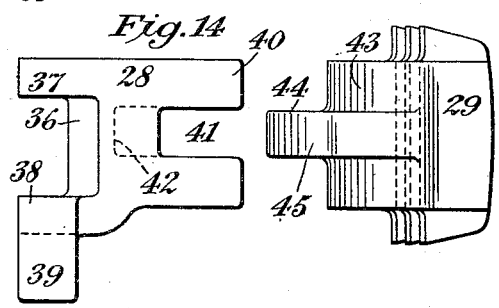
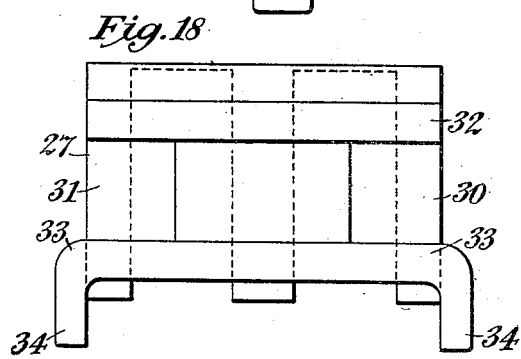
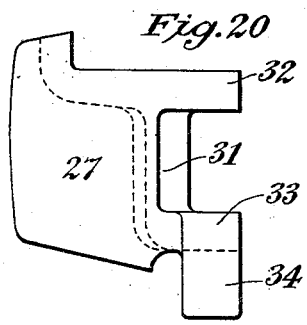
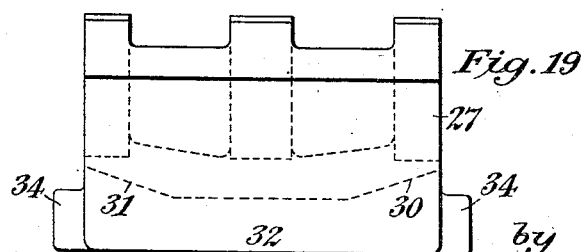

UNITED STATES PATENT OFFICE.

THOMAS GEORGE STILES, OF ARLINGTON, NEW JERSEY, ASSIGNOR TO THE T. GEO. STILES COMPANY, OF ARLINGTON, NEW JERSEY, A CORPORATION OF NEW JERSEY.

RAIL-BRACE.

1,230,534.  Specification of Letters Patent.  Patented June 19, 1917.

Application filed February 18, 1916. Serial No. 79,008.

*To all whom it may concern:*

Be it known that I, THOMAS GEORGE STILES, a citizen of the United States, and a resident of Arlington, in the county of Hudson and State of New Jersey, have invented certain new and useful Improvements in Rail-Braces, of which the following is a specification.

This invention relates to means for locating and holding railroad rails, and especially to rail-braces for giving rails additional lateral support at switches, curves and other points on a line of railway where it may be found desirable to use such devices.

One of the principal objects of my present invention is to provide suitable means, preferably in the form of a rail-brace, for locating a rail with respect to a given point or spacing it with respect to another rail, which means will be held in place in a simple manner and by a positive and powerful action due to the joint effect of a pair of oppositely-disposed wedges, which will usually be placed substantially crosswise of the rail-brace or other part to be located and held and will secure the same in proper position by the action of the double wedge. The spreading and holding action of such a double wedge is of course applicable to rail-braces and other rail-engaging devices whether the spreading effect is to be exerted between the rail-brace or other device and a fixed point or between a pair of rails which may have movement relatively to each other crosswise of a track.

Another important feature of the invention is to provide in connection with a pair of rails disposed at an angle to each other, as is usual for example at a frog, suitable spacing and holding means embodying a universal connection which will permit the rail-brace or other holding means employed to engage one rail and coöperate properly with another and maintain a strong grip upon both notwithstanding the fact that such rails are not in parallelism. In order to accomplish this result I make use of a split block, preferably a three-part block, and also preferably in the form of a rail-brace, in which two of the sections are separated along a curved line or lines for the purpose of forming a universal joint between such sections, while one of these sections and the third have suitable spreading means, preferably that hereinbefore described, applied to them for the purpose of spreading all of the parts of the device into locking engagement with a pair of rails at an acute angle to each other. The preferred construction is one in which the device constitutes a double rail-brace adapted for coöperation with the heads and flanges of both rails.

Other features of the invention not hereinbefore referred to will be hereinafter described and claimed and are illustrated in the accompanying drawings, in which—

Figure 1 is a plan of a portion of a double-track railroad at a switch-point having the usual frogs and movable point-rails, with the rails suitably located and braced by means of devices embodying my present invention.

Fig. 2 is an enlarged plan of one of the rail-braces shown in Fig. 1, it being of a type coöperative with one rail and with a suitable fixed point.

Fig. 3 is an end elevation of the same.

Fig. 4 is a side elevation of the same as viewed from the right in Fig. 2.

Figs. 5, 6, and 7 are respectively a plan, a side elevation and an end elevation of the rail-brace proper shown in Figs. 2 and 3.

Figs. 8 and 9 are corresponding plan and side views of a fixed element or block constituting the other main member of the locating and holding device shown in Figs. 2 and 3.

Figure 10:
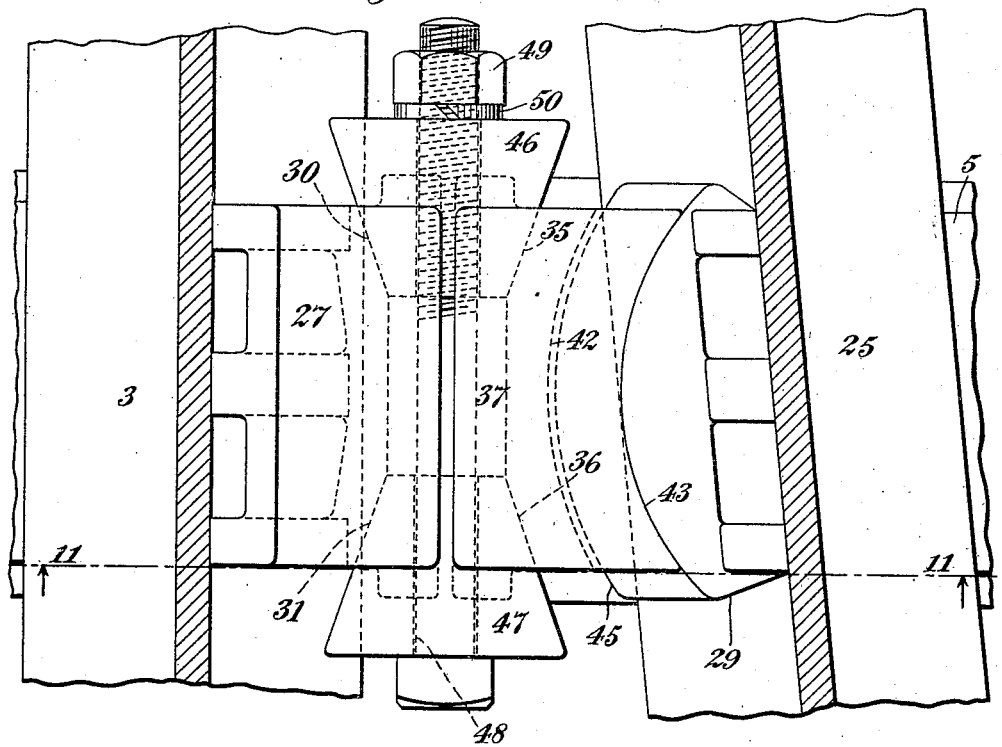

Fig. 10 is a sectional plan of another portion of Fig. 1, illustrating a type of holding device or rail-brace adapted for coöperation with a pair of rails disposed at an acute angle to each other.

Figure 11:
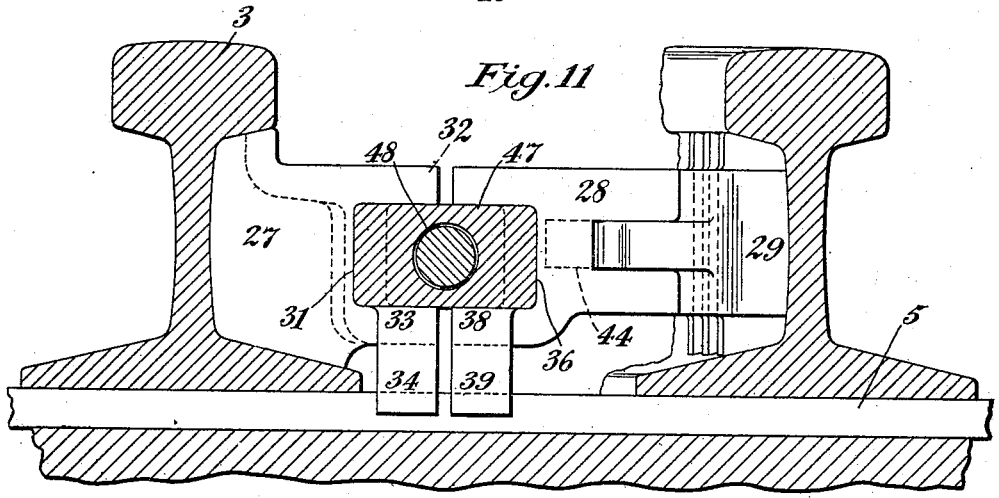

Fig. 11 is a vertical transverse section of the same, the section being taken in line 11—11 of Fig. 10 and looking in the direction of the arrows.

Figs. 12, 13, and 14 are respectively an end elevation, a plan and a side elevation of the intermediate element of the rail-brace shown in Fig. 10.

Figs. 15, 16 and 17 are respectively a plan, an inner end elevation and a side elevation of the outer universal element of said rail-brace.

Figs. 18, 19 and 20 are respectively an inner end elevation, a plan and a side elevation of the outer adjusting or spreading element of said rail-brace.

Similar characters designate like parts in all the figures of the drawings.

As indicated in Fig. 1, the locating and holding device embodying my present invention may be applied to track-rails in various ways and forms and at various points and for various specific purposes. The applications here shown are to the usual stock rails and between the stock-rails and the angular rail-sections of frogs at switches. In all the uses to which it may be applied I employ a rail spacing (or locating) and holding device having means for holding it securely in place, preferably to a tie or other rail-support, the construction being such that when fastened in place it will be held securely and in such a manner that it will be practically impossible for it to work loose under the action of passing trains. Usually it will comprise a holding and locating element, or block, movable transversely to a rail with which it is to coöperate and a suitable resistance element, between which and the first named element or block wedging means of the general character before described will be located.

The preferred construction is one in which said first element or block is in the form of a rail-brace, the rail-brace of the device illustrated in Figs. 2–7 inclusive being designated by 2 and being adapted for coöperation with a stock-rail 3. The part 2 constitutes a complete rail-brace and is adapted to be secured in place and held there by various means. Here, however, this element is intended to be located and held by improved fastening and spreading means involving the principal elements of my invention. In connection with the block 2, or rail-brace proper, I have shown in these views a fixed element or block 4, that is to say, an element in fixed relation with a tie-plate, 5, on a tie, 6. This element or block 4 may be held in fixed relation with the parts 5 and 6 by any suitable means, such as rivets 7. It constitutes practically a part of the tie-plate, but is so constructed as to coöperate with and be substantially an extension of the block or rail-brace 2. The element 2 is intended to have movement relative to the element 4 crosswise of the rail 3 and this movement is here obtained by providing a double wedge between the parts 2 and 4. The adjacent faces of said parts 2 and 4 are here so shaped, as shown in Figs. 2–7 inclusive, as to form between them a channel or key-way of substantially hour-glass form when viewed in plan. The outline of this channel or key-way is indicated in part 2 by the reference characters 8, 9 and 10 and in part 4 by corresponding reference characters 11, 12 and 13. Here this channel or key-way is of the undercut type, that is it has an overhanging shelf at the inner upper edge of each of these parts, said shelves being designated by 14 and 15. As in this construction the lower sides of the parts 2 and 4 are intended to rest directly on the tie-plate 5 a rectangular substantially inclosed key-way is formed between said tie-plate and the inner faces of the parts 2 and 4 and the shelves 14 and 15 when said parts are in the positions shown in Figs. 2 and 3.

In the angular key-way thus formed I place the means for spreading the rail-brace or other corresponding part crosswise of the rail. The means employed preferably comprises a pair of oppositely-facing wedges, such as 16 and 17, and suitable means for supporting them in place in the key-way and maintaining them in any desired position of adjustment with respect to each other. The preferred construction is one in which two wedges substantially oblong in cross-section are bored to receive, and are mounted upon, a tie-bolt, such as 18, the head, 19, of which constitutes a resistance point or stop for locating and also for actuating the wedge 17, while the other end of said tie-bolt is threaded into and preferably through a correspondingly threaded bore in the wedge 16 and has suitable means of any well known kind, such as a nut 20 and a split washer 21, for holding the parts in place after the proper adjustment has been made. The two wedges or wedge-blocks 16 and 17 substantially fit the tapered portions of the key-way the sides of which are defined by the walls 8—11 and 10—13, and it will be obvious that when the tie-bolt is turned and the nut 20 tightened to bring the wedge-blocks 16 and 17 closer together the part 2 will be moved crosswise of the rail, owing to the fact that the part 4 which coöperates therewith is a fixture. The movement will of course be sufficient to locate the rail 3 in its proper position crosswise of the track, and to hold it firmly in place when the element spread by the wedges is a rail-brace or an equivalent device as shown. After the desired adjustment has been obtained the part 2 may be securely fastened to the tie-plate 5 on which it is mounted by any suitable means, such for example as bolts 22, passing through the part 2 and through the tie-plate 5 and the tie 6 and securely held by nuts, 23.

Referring now to Figs. 10–19 inclusive, I have shown in these views, as before stated, locating and holding means adapted for coöperation with a pair of rails disposed at an acute angle to each other, one of which is here shown as a stock-rail 3 and the other of which is a section, 25, of a frog for backing up and bracing a movable frog-point, such as 26, (see Fig. 1). By referring to Fig. 1 it will be seen that the device of Figs. 2-9 inclusive is employed at one side of the stock-rail 3 and the device of Figs. 10-19 inclusive is employed at the other side of said stock-rail and between said stock-rail on one hand and the frog section 25 and the frog-point 26 on the other, the construction being such that the stock-rail is braced at both sides and the point-rail is backed up and supported by a substantially solid structure constituting practically a fixture from the point-rail to the resistance point at the far side of the stock-rail.

In the construction shown in Fig. 10, etc., I have illustrated a multi-part block preferably in the form of a three-part double rail-brace, one of the units of which comprises two main members and the other a single main member, said two units being combined at their adjacent or inner edges with suitable spreading means, preferably substantially of the type described in connection with the previous views. In this case, however, there is practically speaking no fixed or resistance point between which and a rail the spreading means works; but instead there are two movable points (each rail being movable) adapted to be spread sufficiently to be located at the proper distance apart.

An important feature of my present invention, as before indicated, is the provision in connection with a device of this type of a universal joint for assuring a proper grip upon each of the rails 3 and 25 notwithstanding the fact that they are at a considerable acute angle to each other. This universal joint is here shown as embodied in one of the units of the three-part block or double rail-brace and as having a pair of relatively long curved bearing surfaces which will coöperate properly in any of their angular relations. In the specific device illustrated 27 designates one unit of this double rail-brace and corresponds to the element 2 of the construction previously described. 28 and 29 designate the two main elements of the other unit of said double rail-brace, with the intermediate element 28 coöperating at its inner edge with corresponding portions of the section 27 of the device and with suitable spreading means as aforesaid, while at its other face this intermediate section 28 is curved and coöperates with a correspondingly curved face of the outer section 29 of the two-part unit of said double rail-brace.

Specifically the unit 27 shown is a rail-brace adapted to coöperate with the head and flange of the stock-rail 3 substantially in the usual manner. The part 27 at its inner side is shown as channeled, substantially in the same manner as the part 2 previously described, for the purpose of forming half of a key-way for coöperation with a pair of oppositely-disposed wedges. The two oppositely inclined surfaces of this half are indicated at 30 and 31. Here the half key-way so formed is substantially at the vertical center of the main part of the element 27, it constituting substantially a horizontal groove in the inner wall of said device and forming an overhanging shelf, 32, similar to that before described in connection with the part 2; and there is in addition a lower shelf 33, for supporting the wedges. In addition said part 27 preferably has depending lugs, such as 34, for engaging opposite edges of the tie-plate 5 and locating it transversely to said tie-plate so that when in place it cannot be moved in that direction.

The coöperating element 28 is preferably substantially similar to that just described, it having the other half of the key-way for the wedges, the inclined walls of which are designated at 35 and 36, and also having an overhanging shelf, 37, and a lower shelf, 38, spaced in the same manner as the shelves 32 and 33 of the part 27. The part 28 also preferably has depending flanges, 39, for engaging opposite sides of the tie-plate 5 and preventing movement thereof when in place, in a direction crosswise of said tie-plate. In addition the element 28 is shown as having an outer face concaved on an arc of a circle of considerable diameter, indicated at 40, and this concave face is in turn illustrated as intersected by a horizontal opening or groove, 41, disposed substantially centrally of the element 28 in a vertical direction, the back wall of which groove 41 being defined by an arc, 42, parallel with the arc defining the surface 40.

With this intermediate element 28, and particularly with the curved face 40 and the groove 41 just described, the other outer element 29 of the three-part spreading device is intended to coöperate. This element 29 as shown is preferably a rail-brace similar in many respects to the rail-brace 27 of the other unit of this three-part spreading device, but it also embodies a universal element for coöperation with the corresponding element 40—41 of the intermediate section 28 of the spreading device. The principal elements of the part 29 (other than the usual means for engaging the head and the flange of a rail) are a relatively thick central section having a convex vertical face, 43, and a tongue disposed in the central horizontal plane of, and projecting from, said convex face 43 and also convexed in parallelism with the face 43. This central tongue is designated by 44 and the convex surface thereof by 45. Both of the convex surfaces 43 and 45 will preferably be parallel with the corresponding concave surfaces of the intermediate section 28 of the spreading device, but the surfaces 45 and 42 need not be in contact. It will be obvious that the construction just described forms a universal joint made up of a tongue of one part fitting into a corresponding groove of another part of the spreading device in such a manner that the parts match and the universal and horizontal surfaces are in contact. With a device of this kind all the parts when spread are properly supported and braced vertically and also horizontally crosswise of the rails and in addition are braced lengthwise of the rails by the depending lugs 34 and 39.

While a spreading device, either in the form of a rail-brace or otherwise, may be used with a universal joint without being made in the form of a double spreading device or double rail-brace, and while it may also embody any suitable spreading means, the preferred construction as before stated is one in which a double rail-brace having a universal joint is employed and in which oppositely-disposed double wedges serve to spread the units of the device, after the two elements of the universal joint have been properly adjusted and conform to the angle made by the rails 3 and 25. These wedges are here substantially identical with those before described, two wedges, 46 and 47, being shown here also as mounted in an hour-glass-shaped key-way formed between the inner edges of the parts 27 and 28, said wedges being also illustrated as mounted on a tie-bolt, 48, having a smooth shank where it passes through the wedge 47 and a threaded end adapted to turn in a correspondingly threaded bore of the wedge 46, any adjustment that is made being preserved by suitable holding means, such as a nut and washer, 49 and 50, or other proper devices.

What I claim is:—

1. In a device of the character described, a rail brace having a lateral face engaging the rail web and an opposite lateral face provided with oppositely inclined wedging surfaces, a block forming an abutment having a lateral face provided with oppositely inclined wedging surfaces facing the inclined surfaces on the brace, a pair of oppositely facing wedges between the coacting inclined faces of the brace and block, and means for moving said wedges relatively to each other.

2. In a device of the character described, a rail brace having a lateral face engaging a rail web and an opposite lateral face provided with oppositely inclined wedging surfaces, a block forming an abutment having a lateral face provided with oppositely inclined wedging surfaces facing the inclined surfaces on the brace, a pair of oppositely facing wedges between the coacting inclined faces of the brace and block, and a tie bolt connecting said wedges for moving the same relatively to each other.

3. The combination with a rail-support and with a pair of rails disposed at an angle to each other, of an adjustable multi-part block disposed between said rails transversely thereto and engaging the same and embodying a universal joint.

4. The combination with a rail-support and with a pair of rails disposed at an angle to each other, of an adjustable multi-part block disposed between said rails transversely thereto and engaging the same and embodying a universal joint having a long curved bearing surface disposed substantially crosswise of the block.

5. The combination with a rail-support and with a pair of rails disposed at an angle to each other, of an adjustable three-part block divided substantially transversely along straight and curved lines respectively to form with the intermediate section and one end section a universal joint and having means between said intermediate section and the other end section for spreading the block transversely to the rails.

6. The combination with a rail-support and with a pair of rails disposed at an angle to each other, of an adjustable three-part block divided substantially transversely along straight and curved lines respectively to form with the intermediate section and one end section a universal joint and having means between said intermediate section and the other end section for spreading the block transversely to the rails, said means including a pair of oppositely-facing wedges movable relatively to each other.

7. The combination with a rail-support and with a pair of rails disposed at an angle to each other, of a double rail-brace disposed between said rails transversely thereto and engaging the same and one unit of which has a universal joint, and means between the units of said double rail-brace for spreading the same transversely to the rails.

8. The combination with a rail-support, and with a pair of rails disposed at an angle to each other, of a double rail-brace disposed between said rails transversely thereto and engaging the same and one of which has a universal joint, and means between the units of said double rail-brace for spreading the same transversely to the rails, said means including a pair of oppositely-facing wedges movable relatively to each other.

9. The combination with a rail-support and with a pair of rails disposed at an angle to each other, of a double rail-brace disposed between said rails transversely thereto and engaging the same and one unit of which is divided transversely on curved lines to form a universal groove-and-tongue connection, and means between the units of said double rail-brace for spreading the same transversely to the rails.

10. The combination with a rail-support and with a pair of rails disposed at an angle to each other, of a double rail-brace disposed between said rails transversely thereto and engaging the same and one unit of which is divided transversely on curved lines to form a universal groove-and-tongue connection, and means between the units of said double rail-brace for spreading the same transversely to the rails, said means including a pair of oppositely-facing wedges posed between said rails transversely thereto movable relatively to each other, said units having key-ways in their adjacent faces into which said wedges fit.

Signed at New York, in the county of New York and State of New York, this 16th day of February, A. D. 1916.

THOMAS GEORGE STILES.

Copies of this patent may be obtained for five cents each, by addressing the "Commissioner of Patents, Washington, D. C."